(12) United States Patent
Fink et al.

(10) Patent No.: US 9,321,526 B2
(45) Date of Patent: Apr. 26, 2016

(54) COMPOUND HELICOPTER

(71) Applicant: AIRBUS HELICOPTERS DEUTSCHLAND GMBH, Donauworth (DE)

(72) Inventors: Axel Fink, Donauworth (DE); Ambrosius Weiss, Munich (DE); Andrew Winkworth, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 168 days.

(21) Appl. No.: 13/950,570

(22) Filed: Jul. 25, 2013

(65) Prior Publication Data
US 2014/0061367 A1 Mar. 6, 2014

(30) Foreign Application Priority Data
Jul. 27, 2012 (EP) .................................... 12400032

(51) Int. Cl.
*B64C 27/26* (2006.01)
*B64C 39/06* (2006.01)

(52) U.S. Cl.
CPC ............... *B64C 27/26* (2013.01); *B64C 39/068* (2013.01)

(58) Field of Classification Search
CPC ........ B64C 27/26; B64C 27/22; B64C 27/02; B64C 39/068; B64D 27/02
See application file for complete search history.

(56) References Cited

U.S. PATENT DOCUMENTS

| 1,939,682 | A | * | 12/1933 | Fleming ...................... 244/45 R |
| 3,105,659 | A | | 10/1963 | Stutz |
| 3,241,791 | A | | 3/1966 | Piaseck |
| 3,385,537 | A | | 5/1968 | Lichten et al. |
| 3,448,946 | A | | 6/1969 | Nagatsu |
| 5,046,684 | A | | 9/1991 | Wolkovitch |
| 5,503,352 | A | * | 4/1996 | Eger ........................... 244/45 R |
| 6,474,604 | B1 | * | 11/2002 | Carlow ......................... 244/198 |
| 6,513,752 | B2 | | 2/2003 | Carter, Jr. |
| 6,626,398 | B1 | * | 9/2003 | Cox et al. .................... 244/45 R |
| 2005/0151001 | A1 | | 7/2005 | Loper |

(Continued)

FOREIGN PATENT DOCUMENTS

| CA | 2316418 A1 | 8/2000 |
| DE | 69430198 | 7/2003 |

(Continued)

OTHER PUBLICATIONS

European Search Report; European application No. EP 12 40 0032; date of completion of search Dec. 11, 2012.

*Primary Examiner* — Tien Dinh
*Assistant Examiner* — Alexander V Giczy
(74) *Attorney, Agent, or Firm* — Brooks Kushman P.C.

(57) ABSTRACT

The invention relates to a compound helicopter comprising a fuselage, at least one engine and a main rotor driven by said at least one engine. At least one pair of fixed wings are mounted in an essentially horizontal plane on a left hand and a right hand side of the fuselage and horizontally oriented propulsion devices are mounted to each of the fixed wings, the fixed wings encompassing each a drive shaft from the at least one engine. Each fixed wing comprises a lower main wing and an upper secondary wing being connected to each other within an interconnection region. The propulsion devices include pusher propellers arranged at the interconnection region and the upper secondary wing houses the drive shaft from the at least one engine.

18 Claims, 7 Drawing Sheets

(56) References Cited

U.S. PATENT DOCUMENTS

| | | |
|---|---|---|
| 2009/0321554 A1 | 12/2009 | Roesch |
| 2010/0065677 A1 | 3/2010 | Ferrier |
| 2010/0224721 A1* | 9/2010 | Wood et al. .................. 244/12.3 |
| 2011/0114798 A1 | 5/2011 | Gemmati |

FOREIGN PATENT DOCUMENTS

| | | |
|---|---|---|
| EP | 2418148 A2 | 2/2012 |
| GB | 895590 | 5/1962 |
| WO | 2008085195 A2 | 7/2008 |

* cited by examiner

COMPOUND HELICOPTER

CROSS-REFERENCE TO RELATED APPLICATIONS

This application claims priority to European patent application No. EP 12 400032.4 filed Jul. 27, 2012, the disclosure of which is incorporated in its entirety by reference herein.

BACKGROUND OF THE INVENTION (1) Field of the Invention

The invention relates to a compound helicopter with the features of the preamble of claim 1.

Typical compound helicopters comprise a fuselage, a main rotor providing lift and a pair of additional propulsion devices providing thrust and a fixed wing structure on each side in an essentially horizontal plane of the fuselage. Said fixed wing structure provides additional lift during horizontal cruise flight. The propulsion devices are arranged on said wings.

(2) Description of Related Art

The dominant helicopter configuration in the present time is based on Sikorsky's basic design with a main rotor and an auxiliary tail rotor to counter torque. Said conventional helicopters show excellent hover capabilities but suffer from limitations in terms of horizontal flight speed. These limitations are associated to two aerodynamic phenomena at the main rotor: the retreating blade stall and the maximum blade tip velocity. In general terms: The lift and thrust force capabilities of a helicopter rotor decrease with increasing forward speed.

The compound helicopters and so-called convertiplanes are basically the most relevant concepts aiming to overcome the horizontal flight deficiencies of the dominant helicopters by introducing attributes of fixed-wing aircrafts as compromise. However, a compromise between both aircraft types has always to be conveniently adapted to the planned mission profile of the helicopter.

Compound helicopters with lift compounding, thrust compounding or a combination of both basically aim to off-load the main rotor from its simultaneous lifting and propulsive duties to allow for higher forward speeds of the compound helicopter.

A lift compounding entails adding wings to a helicopter hence enabling to increase the load factor of the helicopter and to reach a higher manoeuvrability. This improves the efficiency of the helicopter at moderately high speed but at the expense of reduced efficiencies at lower forward speeds and in the hover.

A thrust compounding implies the addition of essentially horizontally oriented auxiliary propulsion units to the helicopter. This has been typically accomplished by means of a single or a pair of propellers being driven by drive shafts powered by the main turboshaft engines. The use of a pair of propulsion units has the advantage of providing for anti-torque capabilities without the need of an additional tail rotor, hence relativizing the inherent system complexity of the thrust compound configuration.

A more extended configuration of a compound helicopter includes both the addition of wings and propulsion units. The lift during cruise is simultaneously provided by the main rotor—in powered condition—usually addressed as "hybrid helicopter"—or in autorotation—"autogyro"-modus—and wings. The higher forward speed is provided by the horizontally oriented auxiliary propulsion units of the compound helicopter. The compound helicopter hence overcomes the rotor lift limits by means of the wings and the rotor thrust limits by means of the propulsion units. As a result, the benefit of a higher load factor is obtained along with potential for higher speed. The use of a pair of thrust propulsion units—opposed and both offset relative to each other and to a longitudinal axis of the helicopter—enables for a simultaneous torque correction.

Compound helicopters with two wing-mounted propellers are described in U.S. Pat. No. 3,105,659 A, US 2009/0321554 A1 and U.S. Pat. No. 6,513,752 B2. A compound helicopter with a propulsion device as a single nose-mounted propeller is disclosed in US/2005/0151001 A1 or with a single rear-mounted propeller in U.S. Pat. No. 3,241,791 A, CA 2316418 and in U.S. Pat. No. 3,448,946. Said typical configurations feature a pair of main wings located below the main rotor of the compound helicopter.

A canard configuration of a compound helicopter, featuring two main wings behind the main rotor and two nose-mounted canard wings, is described in US 2010/0065677 A1, said configuration outstanding by the lack of a tail boom and the rear position of propulsion propellers, which results in comfort by reducing noise and vibrations and increased passenger safety. Moreover, the canard configuration provides for additional lift, which means that the center of lift of the main wings is allowed to not coincide with the main rotor mast, hence allowing locating the main wings far in the rear of the helicopter. The document US 2011 0114798 A1 discloses a compound helicopter based on a tandem wing configuration with an arrangement of a pair of wings on both the fuselage front end and aft end, the propulsion devices being arranged near the tips of the front wings.

Canard configurations are—as well—not unusual in fixed-wing aircraft design. The canards can have a lifting or a control function. Lifting canards contribute to the total lift of the aircraft, hence allowing for a significant aft position of the main wings and the center of gravity (CofG). To ensure pitch stability, the lift slope of the canard wing has to be lower than that one of the main wing. Typical configurations with aft-tails have a loss of efficiency as a result of the downward lift that must be compensated with extra lift of the main wings. An important penalty arises from the aerodynamic interference between the canards and the main wings. From a structural point of view, lifting canard configurations or even tandem wing configurations offer considerable advantages.

The propulsion devices of compound helicopters are typically attached to the fuselage or arranged at the wings or at the aft end of either the tail boom or the fuselage. The attachment of the propulsion devices to the fuselage is only feasible if using turbojets, allowing undisturbed wings but not allowing anti-torque capabilities, hence still requiring an additional tail rotor. The same applies for configurations with a single main rotor and a tail-boom mounted pusher propeller. Hence propellers are typically arranged on the wings, somewhere between the wing tip and the fuselage or at the wing tip.

Typically, the winged compound helicopter features a monoplane design with one set of wing surfaces in cantilever design as either low-wing, mid-wing or shoulder-wing arrangement. A cantilever wing design has the disadvantage of requiring a central wing box carrying the wing bending moments. The central wing box increases the front masking and the associated drag in the case of a low-wing or shoulder wing design. For a mid-wing design, the central wing box disturbs an inner cabin compartment of the fuselage. For a shoulder-wing design, the main rotor moves further upwards and the aerodynamic efficiency of the wing is negatively affected by its arrangement close to the main rotor. Monoplane low-wing concepts with wing-mounted propellers are not suitable considering the requirement of the propellers being driven by the engines which are typically allocated on top of the helicopter close to the main rotor.

For existing compound helicopters with side mounted, unducted propellers, the location of propellers in the cabin area goes along with serious penalties in terms of passenger safety. In case of a blade separation, the blade has to be retained by additional structural features to avoid a cabin penetration hence additionally increasing the structural weight. Open rotors being placed close to the doors, especially in the case of using tractor propellers at the leading edge of the wings, represent further serious safety penalties during boarding and increase the noise exposure in the cabin.

The document WO 2008/085195 A discloses rotorcraft wings with improved aerodynamic efficiency by a large wing aspect ratio. However, large wing aspect ratios are disadvantageous for a monoplane compound rotorcraft with wing-tip mounted propulsion devices in terms of structural efficiency.

The documents DE 694 30 198 T2 and EP 2 418 148 A2 disclose a fixed wing aircraft design with a stiff and efficient wing configuration even for large-aspect ratios. The so-called joined-wing of box-wing configurations are characterized by the arrangement of a pair of main wings at each side of the aircraft which are interconnected at their tips. Typically, one wing is swept forward and the other is swept back.

The use of external struts for wing bracing is an effective means to reduce the loading of the wing structure, especially at its root, enabling a lighter and stiffer wing design but at the expense of increasing the aerodynamic drag to a certain extent. Advanced braced wing designs aim less noise, cleaner exhaust and lower fuel consumption.

The document GB 895590 A discloses an aircraft for vertical take-off and landing with a rotor, two wings, two or more airscrews whose pitch is reversible and independently variable, four or more interconnected power units, a fuselage having a tail unit, and means controllable by the pilot whereby power can be transmitted wholly or partially to rotor or airscrews depending upon whether the aircraft is to perform vertical or translatory flight. Turbines, located in the upper part of the fuselage, and turbines, on the wings, are connected to the rotor and airscrews by gearing and shafting, which include spur or bevel wheels and connecting shafts and speed reducing and uncoupling means. Each wing has an end portion, which can be folded downwards to lessen the influence of the wings on the lift of the rotor. Fuel tanks at the outer ends of wing portions act as side floats when the aircraft lands or rests on water. In vertical flight, the rotor torque is balanced by operation of the airscrews, one having reverse pitch relative to the other.

The document U.S. Pat. No. 5,046,684 A discloses a tiltrotor aircraft with a joined-wing configuration that eliminates some major speed-limiting constraints of prior tiltrotor configurations-thereby allowing operation into the intermediate speed range of roughly 350 to 450 knots. Joined wings offer relatively rigid, stiffened support for the additional wing-mounted hardware and also stiffen the system to resist rotor flutter and other sources of aggravated loading, that are characteristic of tiltrotor aircraft.

BRIEF SUMMARY OF THE INVENTION

The objective of the present invention is to provide a compound helicopter for high-speed operations whilst ensuring high efficiency in terms of architectural integration, structural weight, aerodynamic behaviour and compliance with operational and safety requirements.

The solution is provided with a compound helicopter with the features of claim 1. Preferred embodiments of the invention are presented with the subclaims.

According to the invention a compound helicopter comprises a fuselage with a longitudinal axis from a rear part to a front part of said fuselage and an upper side and a lower side opposed to said upper side of said fuselage. The inventive compound helicopter comprises at least one engine. A main rotor is mounted to said upper side of said fuselage, said main rotor being driven by said at least one engine.

At least one pair of fixed wings is mounted in an essentially horizontal plane on a left hand and a right hand side of the fuselage and longitudinally oriented propulsion devices are mounted to each of said fixed wings. Each fixed wing comprises a lower main wing and an upper secondary wing, with said upper secondary wing being anhedral and said upper secondary wing and said lower main wing being connected to each other within an interconnection region. The propulsion devices are arranged at said interconnection region of the respective fixed wings. Said upper secondary wing houses the drive shaft from said at least one engine to the propulsion devices or to the main rotor.

The inventive compound helicopter involves lifting and propulsive compounding for high-speed applications with the lower main wing providing most of the lift during high-speed cruise flight while the upper secondary wing provides solely a fraction of the lift of the main wing. The inventive compound helicopter does not need any additional tail rotor. The anti-torque may be provided instead by thrust variations of the propulsion devices mounted opposed to each other at the fixed wings on the left hand and the right hand side of the horizontal plane of the fuselage.

The wing lifting loads can be shared between both the upper and lower wing root joints hence alleviating the stress state of the fuselage. The bracing wings design of the inventive compound helicopter leads to a considerable reduction of the stress state of the lower main wing, hence allowing for a considerably higher structural efficiency of the lower main wing and for reducing its maximum airfoil thickness. The increased structural efficiency translates to important reductions of structural weight of the inventive compound helicopter. As a consequence of sharing the loads between the upper and lower root joints, less loads act on top of the fuselage of the inventive compound helicopter, hence reducing the stress level of the main frames and consequently their weight, especially with regard to crash requirements.

As a consequence of the absence of a thick central wing box, the main rotor can be kept close to the fuselage hence reducing the front masking and the associated aerodynamic drag of the inventive compound helicopter. The joined wing configuration results in a considerably stiffer wing design positively influencing the aircraft's dynamic behaviour. As a result of the joined wing truss configuration and the associated relieve of the wing's stress state and the increase of stiffness, up to 4 times larger aspect ratios and up to 70% lower airfoil thickness ratios are possible in comparison to monoplane cantilever wing concepts, hence increasing the aerodynamic efficiency of the fixed wings of the inventive compound helicopter. The downwash masking of the inventive compound helicopter is reduced increasing the aspect ratio of the wing and having a secondary upper wing. The lower main wing can be used for fuel storage, being arranged close to the main fuel tanks. Moreover, the lower main wing can be used for housing a retractable main landing gear.

According to a preferred embodiment of the invention the lower wing is dihedral.

According to a further preferred embodiment of the invention the at least one engine is arranged on the upper side, preferably on top of the fuselage close under the main rotor and the respective drive shafts in the upper secondary wings drive the propulsion devices mounted in the respective interconnection regions. These drive shafts connect the at least one engine—preferably via gear boxes—to the propulsive devices.

According to a further preferred embodiment of the invention one engine is arranged with a propulsion device at each interconnection region between the upper secondary and the lower main wing and the respective drive shafts in the upper secondary wings drive the main rotor of the inventive compound helicopter. Arranging the engines not on top of the fuselage but within the interconnection region of the upper secondary wing with the lower main wing of the inventive compound helicopter has the following advantages:

Separation of the engines from the fuselage leads to better safety conditions inside the fuselage in case of a fire arising from the engines.

Separation of the engines from each other leads to better safety conditions since the loss of one engine (fire, explosion, blade loss, . . . ) has no effect on the other engine.

Less mass acts on the top of the cabin, hence allowing for better crashworthiness and lower stresses on the main frames.

Easy inspection and maintenance of the engines.

Efficient cooling of the engines.

Exhaust gases can deice the blades of the main rotor.

According to a further preferred embodiment of the invention the upper secondary wing is attached to the upper side of the fuselage close to the main rotor and the lower main wing is attached to the lower side of the fuselage. A wing root attachment allowing the introduction of the longitudinal propulsive forces from the propulsive devices from the lower wing into the fuselage, results in a lower fuselage loading due to said longitudinal propulsive forces being introduced closer to the CofG of the inventive compound helicopter. The lower main wing arranged at the bottom of the inventive compound helicopter, with a maximum distance away from the main rotor at the upper side of the fuselage, is hence less impacted by the downwash from the main rotor achieving better aerodynamic efficiencies.

According to a further preferred embodiment of the invention the lower main wing has a maximum chord 1.2 to 20 times greater than the maximum chord of the upper secondary wing.

According to a further preferred embodiment of the invention the lower main wing comprises ailerons for improved flight control during high-speed operations of the inventive compound helicopter.

According to a further preferred embodiment of the invention the upper secondary wing is straight along its span with a constant chord or being tapered.

According to a further preferred embodiment of the invention the propulsion devices are turbojets or propellers. The propellers are either in pusher configuration with the propellers being arranged behind a trailing edge of its associated lower main wing or in tractor configuration with the propellers being arranged ahead of a leading edge of its associated lower main wing. Using pushers instead of tractors as horizontally oriented propulsion devices keeps the boarding area free of rotating devices. Moreover, the propulsion devices in the form of propellers are arranged in the rear end area of the fuselage which reduces noise and eliminates the risk of a blade penetrating the passenger cabin area in case of a blade loss. Both effects contribute to enhancing the save operation of the inventive compound helicopter and the passengers safety.

According to a further preferred embodiment of the invention a propulsion device housing is arranged on top of the lower main wing and the first root end of the upper secondary wing is attached to an upper part of the propulsion device housing. This allows for a smooth and less sharp shape of the inner interconnection fillet between the lower main wing and the upper secondary wing which translates to less drag.

According to a further preferred embodiment of the invention the upper secondary wing and the lower main wing adopt a braced-wing configuration. The inventive compound helicopter with bracing wings, i.e. with one end of the upper secondary wing being attached to the upper side of the fuselage, the other end being attached to the lower main wing and the lower main wing being attached to the lower side of the fuselage, acts either as a truss construction—with the lower main and the upper secondary wings as hinged truss members—or as a frame. The invention eliminates the need of central wing boxes. In the case of the chord and the lift of the upper secondary wing being substantially less than those of the lower main wing, the upper secondary wing fulfils the main functions of structurally supporting the lower main wing as a streamlined strut and simultaneously housing the drive shafts. Preferable the upper secondary wing is shaped like a streamlined strut for improved aerodynamic efficiency.

According to a further preferred embodiment of the invention the lower main wings end at the interconnection regions or—as an alternative—the lower main wings extend beyond the interconnection regions.

According to a further preferred embodiment of the invention an outboard wing is attached to each interconnection region. The resulting outboard wing provides for extra lift and protects the propellers.

According to a further preferred embodiment of the invention the lower main wing has an aspect ratio between 2 and 15.

According to a further preferred embodiment of the invention the upper secondary wing is rearward swept in the range of −10° to −45° and/or the main lower wing has a sweep angle in the range of −30° to 30° to enhance even more save operation of the inventive compound helicopter and the safety of the passengers. These advantages of the inventive compound helicopter keep the boarding area free of rotating devices hence eliminating the risk of a blade penetrating the passenger cabin area in case of a blade loss by having the main lower wings arranged further back on the fuselage, which means having the upper secondary wings as well swept back. The aerodynamic interaction of the upper secondary and the lower main wings can be positively influenced by the sweep angle and the relative position of the wings to each other.

According to a further preferred embodiment of the invention canard wings are mounted on the left hand and the right hand sides of the front part of the fuselage. The canard wings are required for pitch stability in the case of placing the main lower wings further aft since the lift point of the fixed wings is then in a longitudinal direction of the inventive compound helicopter no longer coincident with the main rotor mast.

According to a further preferred embodiment of the invention the interconnection region comprises a pylon, the pylon connecting the lower main wing to either the upper secondary wing or to a housing of the propulsive device.

According to a further preferred embodiment of the invention the pylon has an angle in a range between +45° and −45° to a vertical axis.

According to a further preferred embodiment of the invention the wing-to-fuselage attachments are hinged joints as the wing-to-fuselage attachments allow a design free of bending moments. The structural joints of the lower main and the upper secondary wings to the fuselage of the inventive compound helicopter are simple, allowing for easy detachability and are easy to implement within conventional fuselage architectures.

According to a further preferred embodiment of the invention the longitudinal position of the fixed wings is such that the main rotor is allocated between the leading edge and the trailing edge of the lower main wing root area, the lift resulting from the upper secondary and lower main wings being more or less coincident with the longitudinal position of the mast of the main rotor, which is more or less coincident with the CofG of the compound helicopter.

BRIEF DESCRIPTION OF THE SEVERAL VIEWS OF THE DRAWINGS

Preferred embodiments of the invention are outlined by way of example with the following description with reference to the attached drawings.

DETAILED DESCRIPTION OF THE INVENTION

Figure 1:
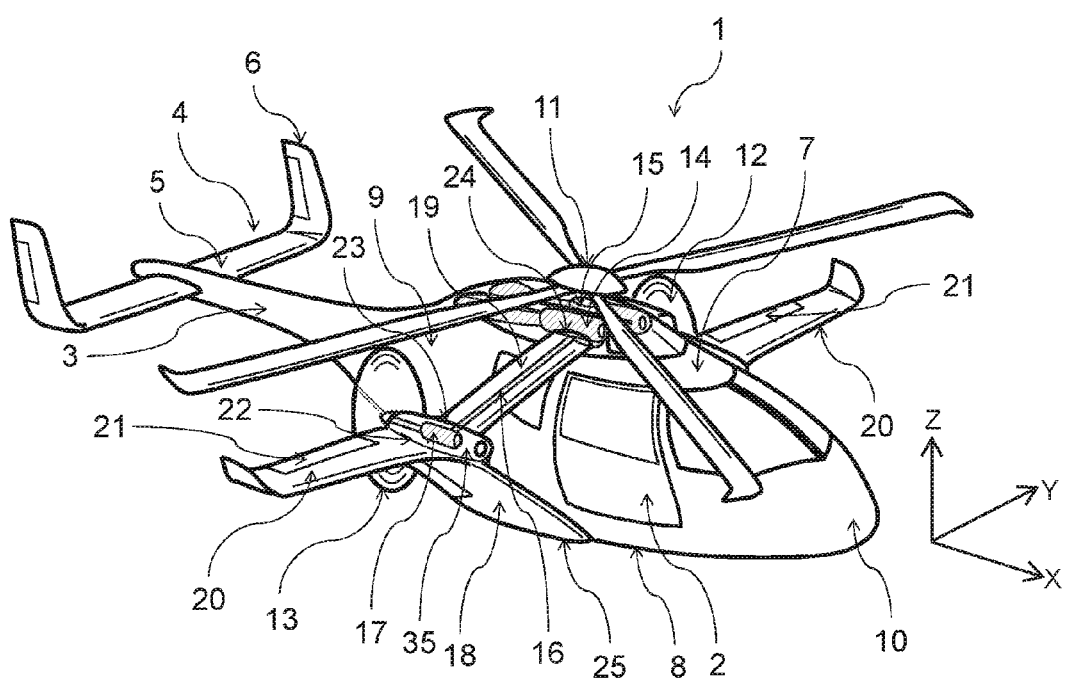
FIG. 1 shows an overall view of a compound helicopter according to the invention.

As shown for reference in FIG. 1, three mutually orthogonal directions X, Y, and Z form a three-dimensional frame of reference XYZ. A "longitudinal" direction X corresponds to the roll axis 29 inherent to the compound helicopter 1. Another direction Y the to be "transverse" is perpendicular to the roll axis 29 and corresponds to the pitch axis 30 of the compound helicopter 1. The X-Y plane is considered to be "horizontal". A third direction Z corresponds to the yaw axis of the compound helicopter 1, oriented perpendicular with respect to the X-Y plane. Corresponding features of the invention are referred to with the same references throughout the figures shown.

According to FIG. 1 a compound helicopter 1 comprises a fuselage 2—with a front part 10, a rear part 9, an upper side 7 and a lower side 8. A tail boom 3 is attached to the rear part 9 of the fuselage 2 with an empennage 4 with a horizontal tail plane 5 and two vertical tail planes 6. A main rotor 11 with four blades is mounted to the upper side 7 of the fuselage 2. The positive longitudinal direction X is along the roll axis 29 from the rear part 9 to the front part 10 of the fuselage 2.

Fixed wings are mounted essentially in the horizontal plane on a left hand and a right hand side of the fuselage 2. Each of the fixed wings are composed of a lower main wing 18 and an upper secondary wing 19, the upper secondary wing 19 being placed above the lower main wing 18. The upper secondary wing 19 is straight along its span, with a constant chord. The upper secondary wing 19 has a smaller chord than the lower main wing 18 and houses drive shafts 16. A first root end 25 of the lower main wing 18 is attached to the lower side 8 of the fuselage 2. A second root end 24 of the upper secondary wing 19 is attached to the upper side 7 of the fuselage 2. A first end 23 of the upper secondary wing 19 is attached to the lower main wing 18 at an interconnection region 22.

One propulsion device 12, 13 is incorporated at each of the interconnection regions 22 at the left hand and the right hand side of the fuselage 2. The propulsion devices 12, 13 are housed within respective propulsion device housings 35. The propulsion devices are pusher propellers 12, 13.

Each upper secondary wing 19 provides for additional lift and supports the associated lower main wing 18 while housing one of the drive shafts 16. Each drive shaft 16 is connected with an outer end to a gear box 17 of the left hand or the right hand side propeller 12, 13, arranged within the interconnection region 22. Each drive shaft 16 is as well connected with a central end to a main gear box 15 which is allocated close to the main rotor 11 at the upper side 7 of the fuselage 2.

The lower main wing 18 extends beyond the interconnection region 22 with an outboard wing 20. This outboard wing 20 is an integral part of the lower main wing 18.

The lower main wing 18 features ailerons 21, which are preferably arranged at the outboard wing 20 and optionally within the lower main wing 18 between the interconnection region 22 and the first root end 25. The upper secondary wings 19 are straight along their span in order to accommodate the drive shafts 16.

Figure 2:
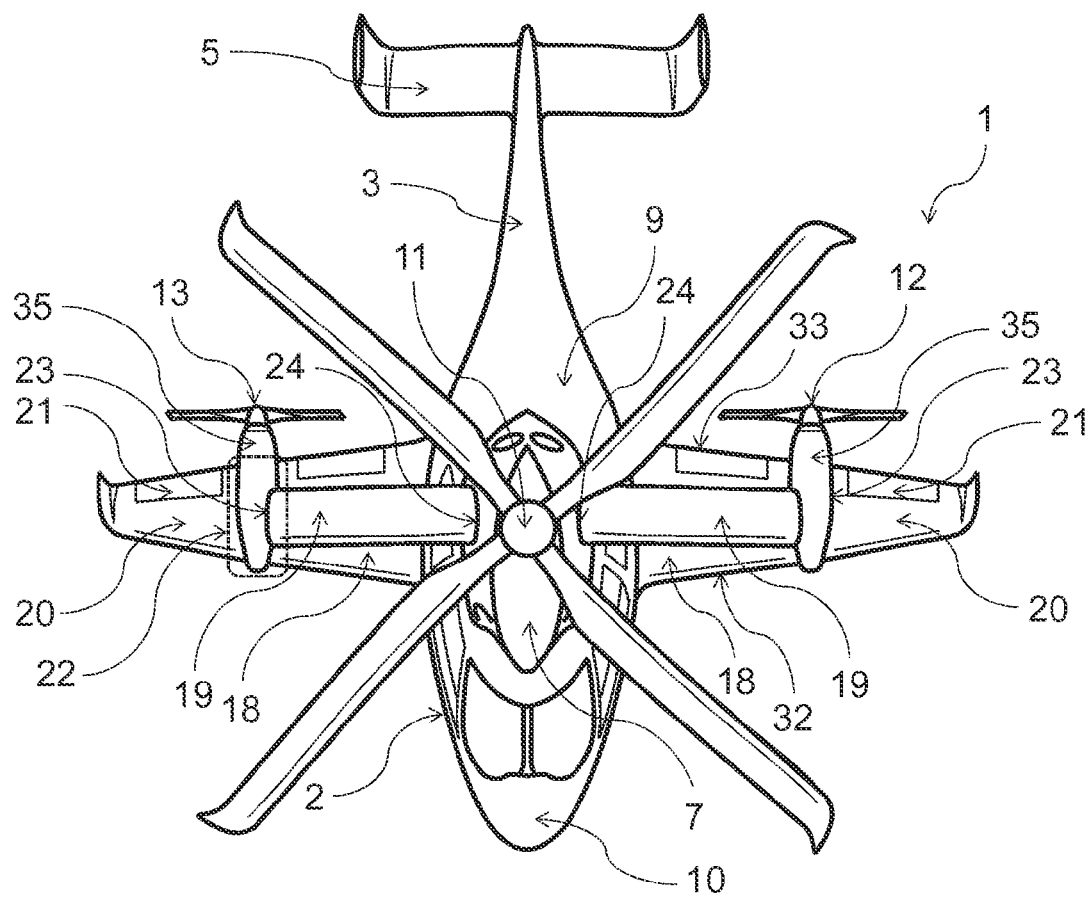
FIG. 2 shows a top view of the compound helicopter according to FIG. 1.

According to FIG. 2 the chord, i.e. the airfoil width, of the upper secondary wing 19 is smaller than the chord of the lower main wing 18. The upper secondary wing 19 is free of ailerons. Pusher propellers 12 and 13 are installed parallel to the longitudinal axis 29 within the interconnection region 22 and behind a trailing edge 33 of the lower main wing 18. Housings 35 of the pusher propellers 12 and 13 extend to the respective leading edges 32 of the lower main wing 18. The lower main wings 18 and the upper secondary wings 19 are unswept. The upper secondary wing 19 has constant chord, i.e. no taper, or is tapered. The lower main wing 18 is tapered. The longitudinal position of the fixed wings is such that the main rotor 11 is allocated between the leading edge 32 and the trailing edge 33 of the lower main wing root area, the lift resulting from the upper secondary and lower main wings 19, 18 being more or less coincident with the longitudinal position of the mast of the main rotor 11, which is more or less coincident with the CofG of the compound helicopter 1.

Figure 3:
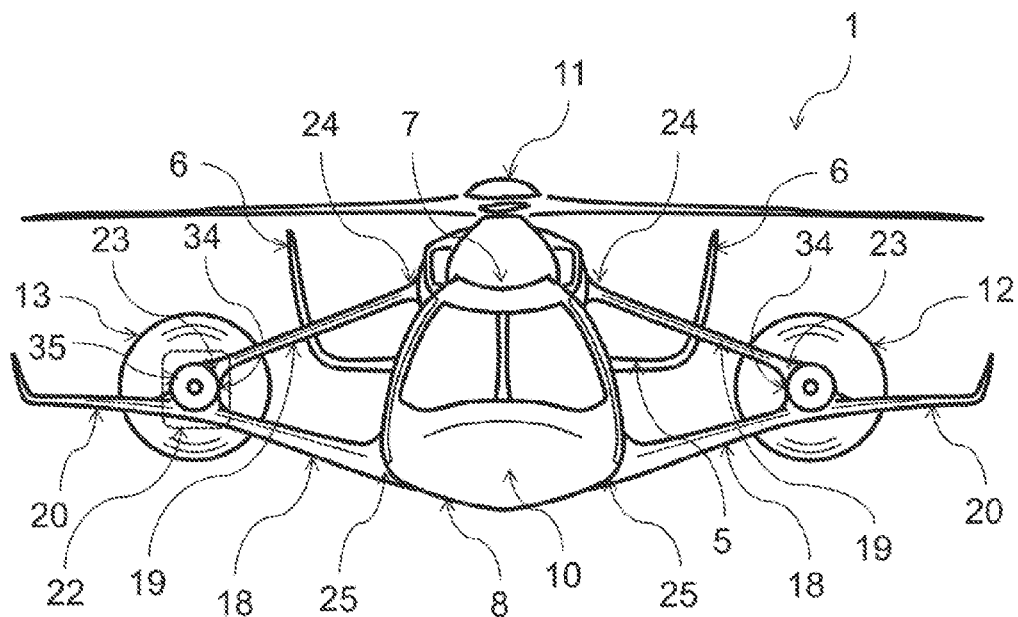
FIG. 3 shows a front view of the compound helicopter according to FIG. 1.

According to FIG. 3 the first root end 25 of the lower main wing 18 is attached to the fuselage 2 at its lower side 8 and the second root end 24 of the upper secondary wing 19 is attached to the fuselage 2 at its upper side 7 close to the main rotor 11. The upper secondary wing 19 and the lower main wing 18 are interconnected at the interconnection region 22. Hence, the upper secondary wing 19 features anhedral and the lower main wing 18 features dihedral. The upper secondary wing element 19 is straight along its span in order to accommodate the straight drive shaft 16.

The propulsive device housing 35 is arranged on top of the lower main wing 18 at the interconnection region 22. The first root end 23 of the upper secondary wing 19 is attached to an upper part of the propulsive device housing 35 allowing a smooth and less sharp shape of an inner interconnection fillet 34 from the main wing 18 to the first root end 23 of the upper secondary wing 19 which translates to less drag.

Figure 4:
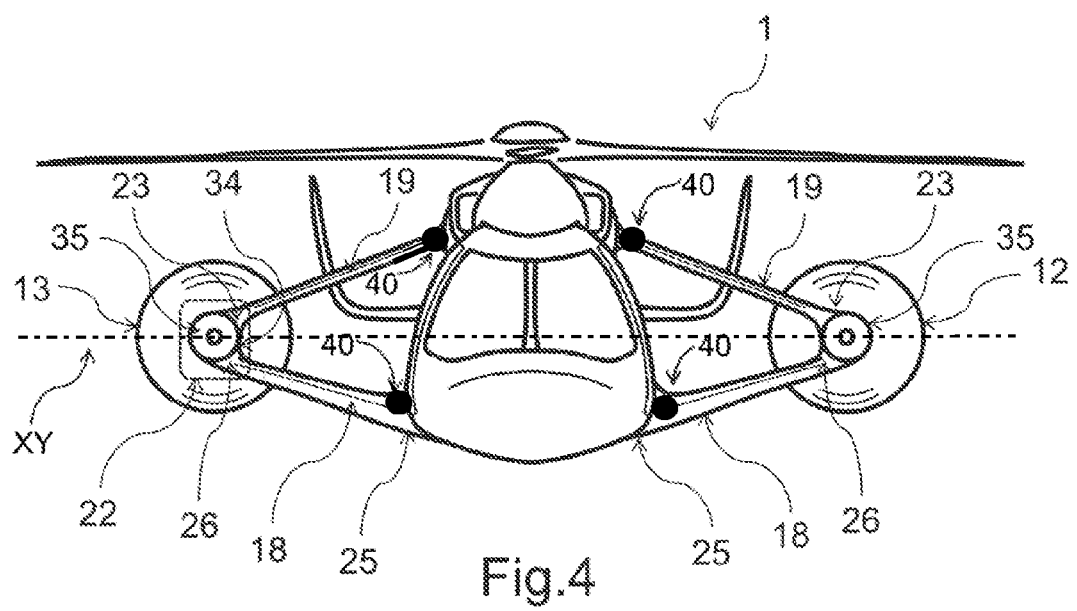
FIG. 4 shows a front view of an alternative compound helicopter according to the invention.

According to FIG. 4 the interconnection region 22 connects the second root end 26 of the lower main wing 18 to the first root end 23 of the upper secondary wing 19 through the propulsion device housing 35. An outboard wing 20 (not shown) as a separate structure can be attached to the second root end 26 of the lower main wing 18. The fixed wings, including each lower main wing 18 and each upper secondary wing 19, are mounted essentially in the horizontal plane XY. The wing-to-fuselage attachments are hinged joints 40 to allow a design free of bending moments. The structural joints of the lower main and the upper secondary wings to the fuselage of the inventive compound helicopter are simple, allowing for easy detachability and are easy to implement within conventional fuselage architectures.

Figure 5:
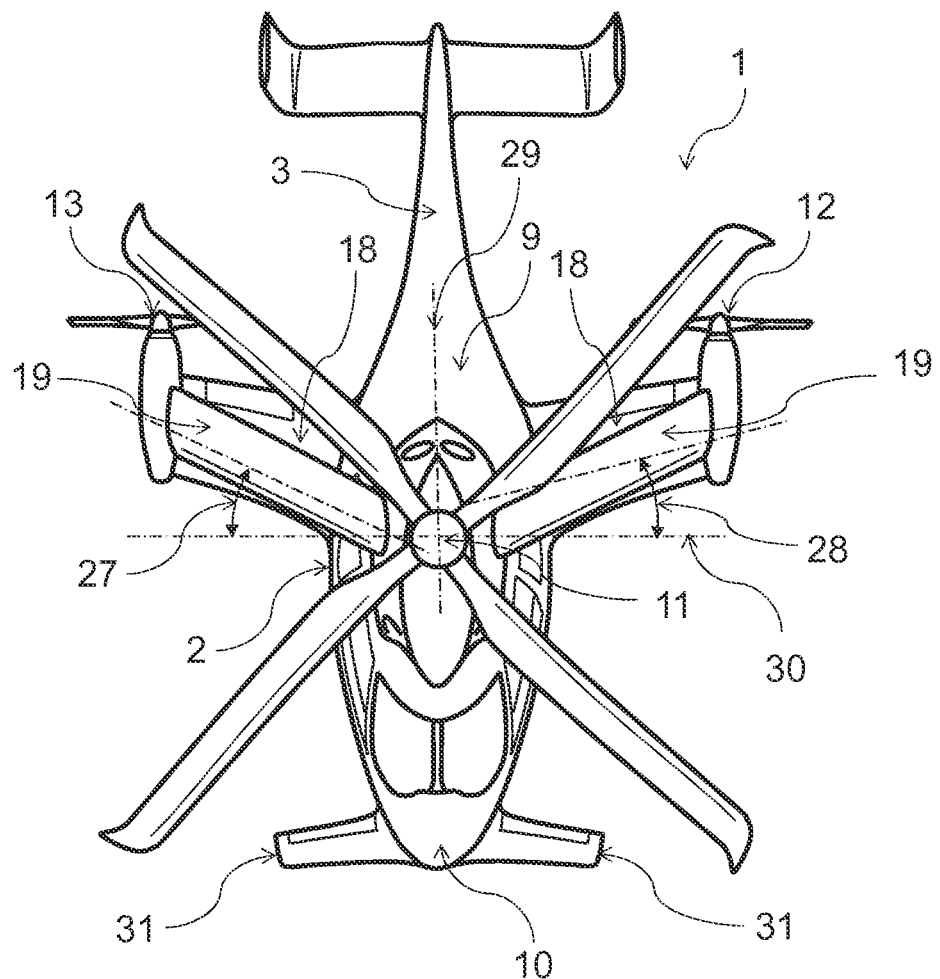
FIG. 5 shows a top view of the alternative compound helicopter according to the invention.

According to FIG. 5 the lower main wing 18 and the upper secondary wing 19 are arranged further back of the fuselage 2, the upper secondary wing 19 showing a rearward swept angle 27 and the main wing showing a rearward swept angle 28. The swept angles 27, 28 are defined as the angle between the transverse axis 30 of the compound helicopter 1 and the respective wing's 25% chord line. The angle 27 of the upper secondary wing 19 is preferably equal or greater than the angle 28 of the lower main wing 18. This configuration allows for a larger, free aircraft's cabin and boarding area. The resulting lifting point of the entire wing structure is hence allocated further aft. Canard wings 31 are provided for pitch stability, which are mounted in the front part 10 at the left hand and the right hand side in the horizontal plane of the fuselage 2. Since the canard wings 31 provide additional lift, the total area of the fixed wings can be reduced, e.g. allowing elimination of the outboard wings 20.

Figure 6:
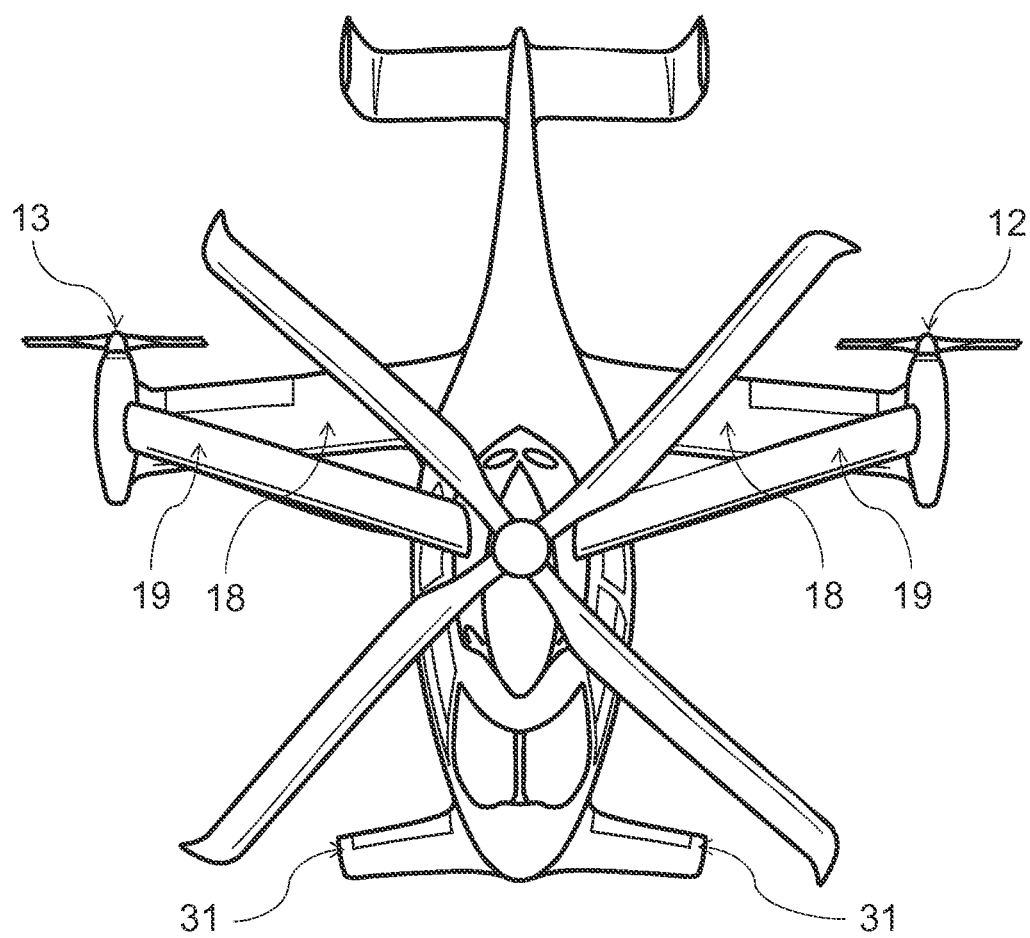
FIG. 6 shows a top view of a further alternative compound helicopter according to the invention.

According to FIG. 6 canard wings 31 and a pair of fixed wings with respective upper secondary wings 19 and lower main wings 18 each with a high aspect ratio allow for aerodynamic efficiency. The upper secondary wings 19 are rearward swept and the main wings 18 are forward swept.

Figure 7:
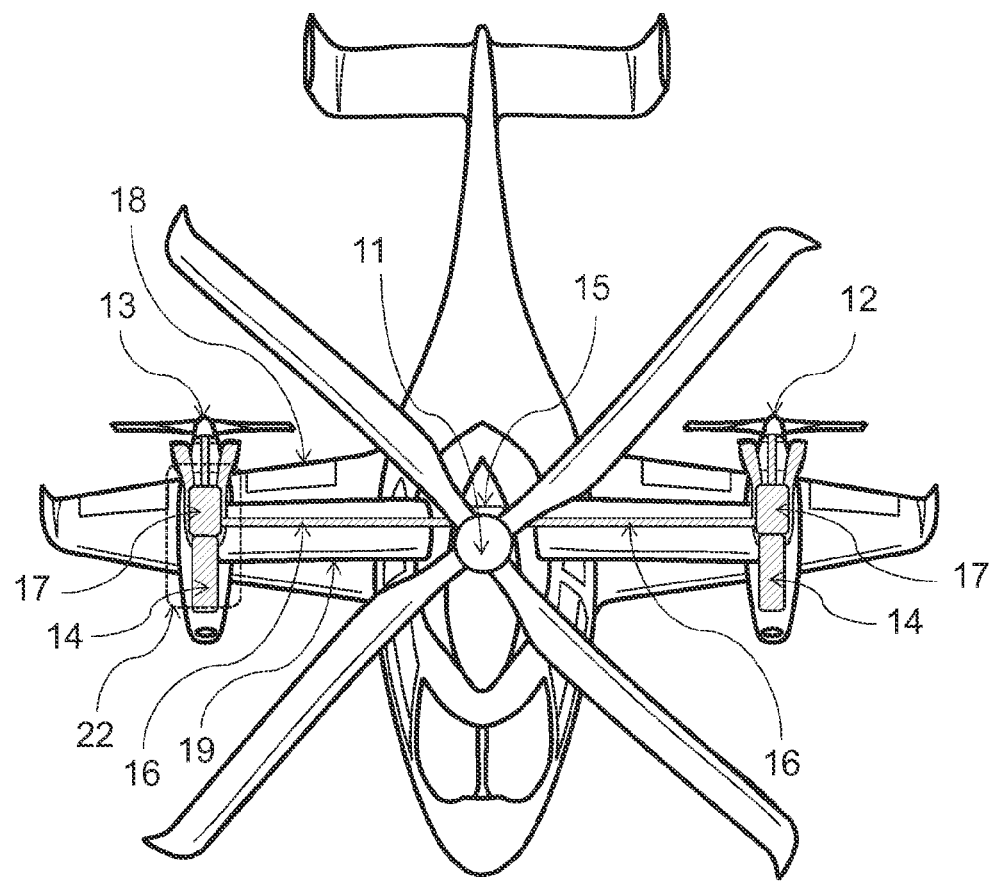
FIG. 7 shows a top view of a still further alternative compound helicopter according to the invention.

According to FIG. 7 engines 14 with gear boxes 17 are arranged with the propulsion devices 12, 13 at the respective interconnection region 22. The drive shafts 16 inside the respective upper secondary wings 19 connect the left hand and the right hand side gear boxes 17 to the central main gear box 15 on top of the fuselage 2 to engage the main rotor 11.

Figure 8:
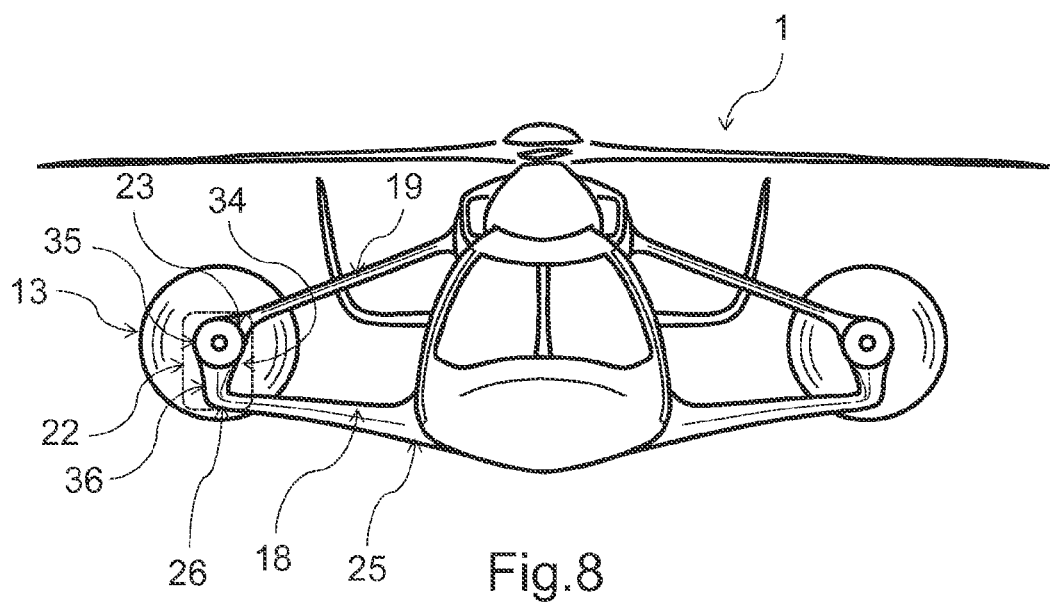
FIG. 8 shows a front view of a still further alternative compound helicopter according to the invention.

According to FIG. 8 the respective interconnection regions 22 at the left hand and the right hand side of the compound helicopter 1 comprise each a pylon 36, which essentially vertically extend from the lower main wings 18. The pylons 36 connect the second root ends 26 of the lower main wings 18 to the propulsion device housings 35 above the main wings 18. The first ends 23 of the secondary wings 19 are attached to the respective propulsion device housings 35. Doing so, the interconnection fillet 34 becomes larger and the associated drag smaller.

Figure 9:
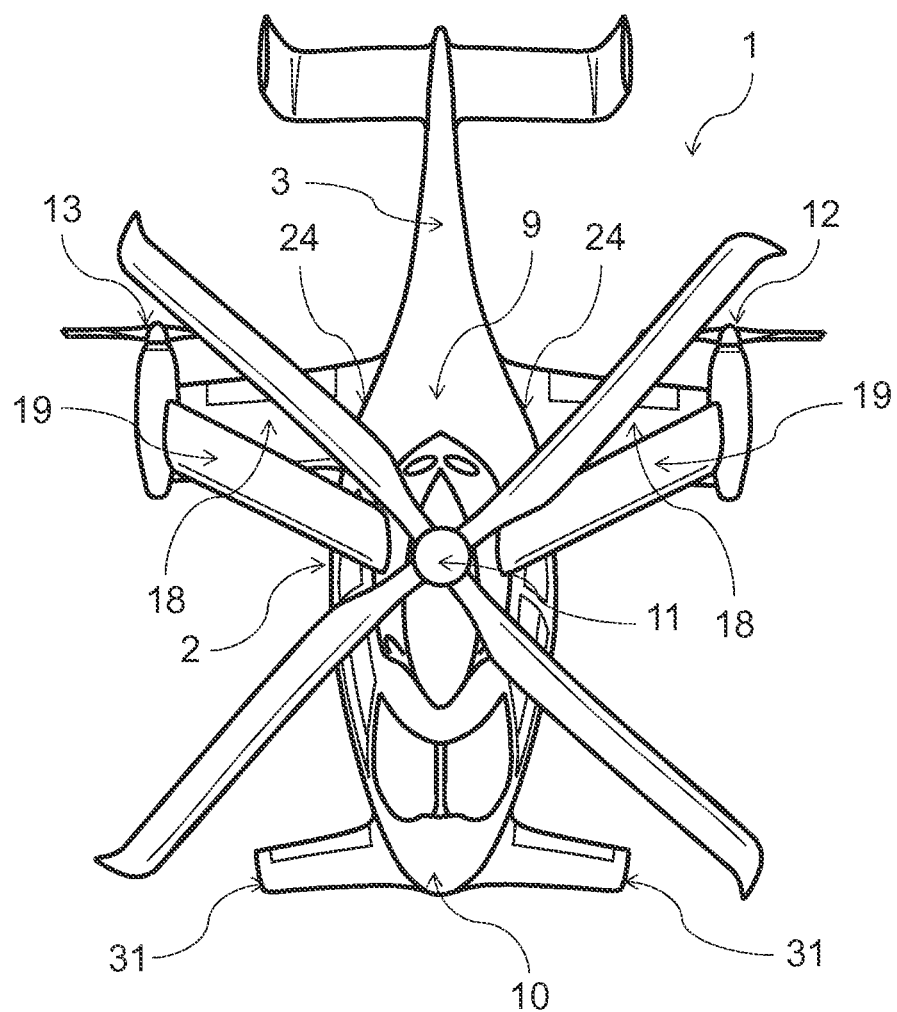
FIG. 9 shows a top view of another alternative compound helicopter according to the invention.

According to FIG. 9 the canard wings 31 and a pair of fixed low aspect ratio wings with respective upper secondary wings 19 and lower main wings 18 are provided. The upper secondary wings 19 are rearward swept and the main wings 18 are forward swept.

REFERENCE LIST

1. Compound helicopter
2. Fuselage
3. Tail boom
4. Empennage
5. Horizontal tail plane
6. Vertical tail plane
7. Upper side of fuselage
8. Lower side of fuselage
9. Rear part of fuselage
10. Front part of fuselage
11. Main rotor
12. Propulsion device left side
13. Propulsion device right side
14. Engine
15. Main gearbox
16. Drive shaft
17. Gearbox
18. Lower main wing
19. Upper secondary wing
20. Outboard wing
21. Aileron
22. Interconnection region of upper and lower wing
23. First root end of the secondary wing (outer end)
24. Second root end of the secondary wing (inner end)
25. First root end of the main wing (inner end)
26. Second root end of the main wing (outer end)
27. Sweep angle of the secondary wing
28. Sweep angle of the main wing
29. Aircraft longitudinal axis
30. Aircraft transverse axis
31. Canard wings
32. Main wing leading edge
33. Main wing trailing edge
34. Interconnection fillet between the main wing and the secondary element
35. Propulsion device housing
36. Pylon

What is claimed is:

1. A compound helicopter comprising:
a fuselage with an upper side, a lower side opposed to the upper side, a left hand side, a right hand side, and a transverse axis extending from the left hand side to the right hand side;
at least one engine disposed on the upper side of the fuselage;
a main rotor mounted to the upper side of the fuselage at the transverse axis, the main rotor being driven by the at least one engine;
a first fixed wing mounted on the left hand side and a second fixed wing mounted on the right hand side of the fuselage; and
a respective longitudinally oriented propulsion device mounted to each of the fixed wings at a respective tip of each of the fixed wings, the fixed wings encompassing encompassing each a respective drive shaft from the at least one engine, wherein:
each fixed wing comprises a lower main wing and an upper secondary;
wing, and the upper secondary wing is anhedral;
the upper secondary wing and the lower main wing of each fixed wing are connected to each other within an interconnection region;
each respective propulsion device is arranged at the respective interconnection region of the respective fixed wing aft of the transverse axis, the propulsion devices including propellers in pusher configuration, the propellers being arranged aft of respective trailing edges of the respective fixed wings; and
and the upper secondary wings house the respective drive shafts from the at least one engine.

2. The compound helicopter according to claim 1, wherein the lower main wing is dihedral.

3. The compound helicopter according to claim 1, wherein the respective drive shafts in the upper secondary wings drive the propulsion devices.

4. The compound helicopter according to claim 1, wherein the upper secondary wing is attached to the upper side of the fuselage and the lower main wing is attached to the lower side of the fuselage.

5. The compound helicopter according to claim 1, wherein the lower main wing has a maximum chord 1.2 to 20 times greater than the maximum chord of the upper secondary wing.

6. The compound helicopter according to claim 1, wherein the lower main wing comprises ailerons.

7. The compound helicopter according to claim 1, wherein the upper secondary wing is straight along an upper secondary wing span with a constant chord or tapered.

8. The compound helicopter according to claim 1, wherein a propulsion device housing is arranged on top of the lower main wing and the first root end of the upper secondary wing is attached to an upper part of the propulsion device housing.

9. The compound helicopter according to claim 1, wherein the upper secondary wing is shaped like a streamlined strut.

10. The compound helicopter according to claim 1, wherein the lower main wing has an aspect ratio between 2 and 15.

11. The compound helicopter according to claim 1, wherein the upper secondary wing is rearward swept in the range of −10° to −45° relative to the transverse axis.

12. The compound helicopter according to claim 1, wherein the lower main wing has a sweep angle in the range of −30° to 30°.

13. The compound helicopter according to claim 1, wherein the interconnection region comprises a pylon, the pylon connecting the lower main wing to either the upper secondary wing or to a housing of the propulsion device.

14. The compound helicopter according to claim 13, wherein the pylon has an angle in a range between ±45° and −45° to a vertical axis.

15. The compound helicopter according to claim 1, wherein the lower main wing and the upper secondary wing are attached to the fuselage by hinged joints.

16. A rotorcraft comprising:
a fuselage with a port side, a starboard side, and a transverse axis extending from the port side to the starboard side;
at least one engine;
a main rotor mounted to the fuselage at the transverse axis, the main rotor being driven by the at least one engine;
a first fixed wing coupled to the port side, the first fixed wing including a first lower wing and a first upper wing joining at a first junction, the first junction being spaced from the fuselage;
a second fixed wing coupled to the starboard side, the second fixed wing including a second lower wing and a second upper wing joining at a second junction, the second junction being spaced from the fuselage;
a first propulsion device coupled to the first junction at a tip of the first fixed wing and driven by the at least one engine, the first propulsion device including a first pusher propeller arranged aft of the first fixed wing and aft of the transverse axis; and
a second propulsion device coupled to the second junction at a tip of the second fixed wing and driven by the at least one engine, the second propulsion device including a second pusher propeller arranged aft of the second fixed wing and aft of the transverse axis.

17. The rotorcraft of claim 16, wherein the first lower wing, the first upper wing, the second lower wing, and the second upper wing are aft-swept.

18. The rotorcraft of claim 16, further comprising a first drive shaft retained within the first upper wing and a second drive shaft retained within the second upper wing, wherein the at least one engine is disposed on the fuselage and the first drive shaft and the second drive shaft drivingly couple the at least one engine to the first propulsion device and the second propulsion device, respectively.

* * * * *